UNITED STATES PATENT OFFICE.

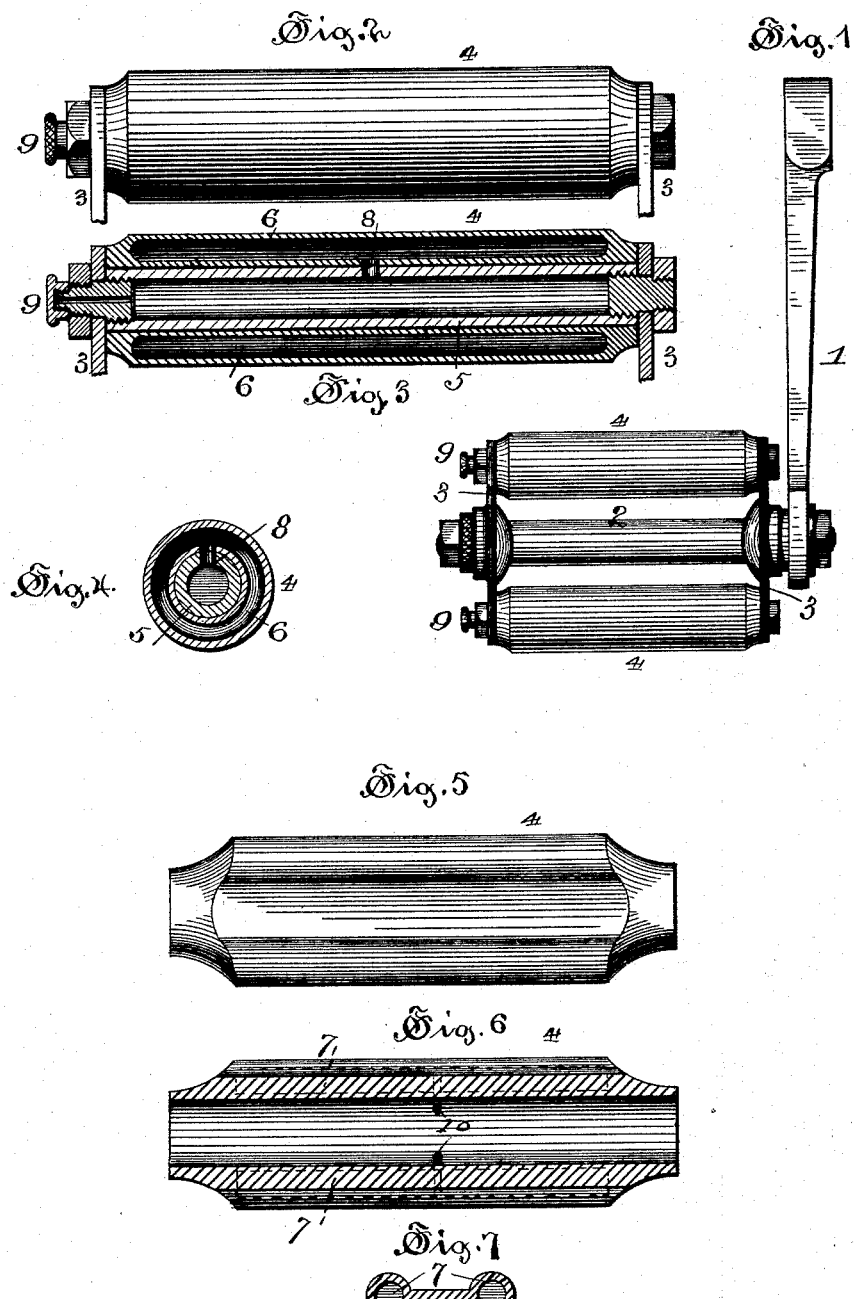

FREDERICK C. ROCKWELL, OF HARTFORD, CONNECTICUT.

PEDAL FOR VELOCIPEDES.

SPECIFICATION forming part of Letters Patent No. 483,238, dated September 27, 1892.

Application filed October 1, 1891. Serial No. 407,431. (No model.)

*To all whom it may concern:*

Be it known that I, FREDERICK C. ROCKWELL, a citizen of the United States, residing at Hartford, in the county of Hartford and State of Connecticut, have invented certain new and useful Improvements in Pedals, of which the following is a full, clear, and exact specification.

This invention relates to the class of pedals used on bicycles, tricycles, and similar velocipedes; and the object of the invention is to provide a pedal for velocipedes which is lighter in weight, more durable, and at the same time more elastic, and to relieve and cushion the jars and vibrations of the machine and cause a closer and easier contact between the pedal and the foot to prevent the latter from slipping than prior pedals.

Referring to the accompanying drawings, Figure 1 is a side view of a bicycle-pedal. Fig. 2 is an enlarged view of one of the treads of the pedal. Fig. 3 is a longitudinal section. Fig. 4 is a transverse section of the same. Fig. 5 is a side view of a tread of different shape embodying my improvement. Fig. 6 is a longitudinal section, and Fig. 7 is a transverse section, of this latter form.

In the views, 1 indicates the crank of a bicycle-pedal, from the end of which projects the arm 2, which supports in the usual manner by ball or other bearings the tread-plates 3. The toe and ball of the foot-treads 4, which are rotarily supported between the ends of the plates 3 upon spindles 5, that are preferably hollow, are formed of any suitable elastic or flexible material non-penetratable to air—as india-rubber, gum, or cloth, or the like—with an air cavity or chamber 6. The treads may be cast or molded of india-rubber or made of rubber or other air-tight cloth with but a single chamber just beneath the periphery by the customary method of working such substances, or several separated chambers 7 may be made in different portions of the tread, as in the modified shape shown. If the spindle which supports the tread is tubular, a passage 8 may be made from the air-chamber to the center of the spindle, which is tightly and permanently closed at one end and provided at the opposite end with a valve 9, which may be opened so that air can be pumped through it and the spindle into the chamber to inflate and fill out the tread, and if the tread is formed with several separate air-chambers passages 10 may be made from each chamber to the center of the spindle for the passage of the inflating medium. If desired, however, the valve may be inserted directly into the end of the material of the tread, in which case the spindle is not necessarily hollow.

The treads may be of any desired contour; but it is preferred that they shall be round in cross-section, as that is the shape most easily and cheaply made, and is just as desirable, as the foot of the rider slightly settles and cushions itself in the resilient surface of my treads, forming an easy bed from which it will not readily slip, although the surface is not roughened or especially provided with an antifriction surface, which is not the case with the solid treads of prior pedals.

Pedals provided with treads made according to my invention are light in weight, cheap in construction, and more durable than the prior pedals having solid treads, as the jars and vibrations of the machine are relieved by the air-cushioned treads, so that the weight of the rider of the machine is applied to the pedals and is not solidly transmitted as a blow through the pedals to the bearings when jolted under fast running, and the resiliency of the treads gives them a longer life, as they give and do not wear under temporary additional force. This resiliency also relieves the foot of the rider, so that it will not as soon tire, and, if desired, one of the treads may be inflated to a greater degree of stiffness, so that it will be more firm than the other to resist the greater pressure which is applied by the ball of the foot than by the toe.

I claim as my invention—

1. In combination with the crank of a velocipede, a pedal having a tread of elastic material provided with a spindle-opening and an air-chamber with flexible walls, substantially as specified.

2. In combination with the crank of a velocipede, a pedal having a tread provided with an air-chamber and an outlet from the air-chamber, provided with a valve whereby the tread may be inflated, substantially as specified.

3. In combination with the crank of a velocipede, a pedal having a pair of treads supported upon hollow spindles and provided with air-chambers and valves attached to the hollow spindles, whereby the treads may be inflated, substantially as specified.

FREDERICK C. ROCKWELL.

Witnesses:
H. R. WILLIAMS,
A. L. PEASE.